United States Patent
Fernandez Alonso et al.

(10) Patent No.: US 9,083,714 B2
(45) Date of Patent: Jul. 14, 2015

(54) METHOD AND APPARATUS FOR AN IMS RESTORATION PROCEDURE

(75) Inventors: Susana Fernandez Alonso, Madrid (ES); Miguel Angel Munoz De La Torre Alonso, Madrid (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 285 days.

(21) Appl. No.: 13/636,408

(22) PCT Filed: Apr. 21, 2010

(86) PCT No.: PCT/EP2010/055298
§ 371 (c)(1),
(2), (4) Date: Sep. 21, 2012

(87) PCT Pub. No.: WO2011/131240
PCT Pub. Date: Oct. 27, 2011

(65) Prior Publication Data
US 2013/0010804 A1   Jan. 10, 2013

(51) Int. Cl.
*H04L 29/06* (2006.01)
*H04L 29/08* (2006.01)
*H04L 29/14* (2006.01)
*H04L 12/24* (2006.01)

(52) U.S. Cl.
CPC .......... *H04L 65/1016* (2013.01); *H04L 65/104* (2013.01); *H04L 65/105* (2013.01); *H04L 65/1006* (2013.01); *H04L 65/1073* (2013.01); *H04L 67/16* (2013.01); *H04L 69/40* (2013.01); *H04L 41/06* (2013.01); *H04L 67/1029* (2013.01); *H04L 67/1034* (2013.01)

(58) Field of Classification Search
None
See application file for complete search history.

(56) References Cited

U.S. PATENT DOCUMENTS

| | | | | |
|---|---|---|---|---|
| 2008/0144605 | A1* | 6/2008 | Qiu et al. | 370/352 |
| 2009/0116467 | A1* | 5/2009 | Shi et al. | 370/338 |
| 2010/0121960 | A1* | 5/2010 | Baniel et al. | 709/228 |
| 2010/0217855 | A1* | 8/2010 | Przybysz et al. | 709/223 |

FOREIGN PATENT DOCUMENTS

WO   WO 2009/039894   4/2009

OTHER PUBLICATIONS

3GPP TS 23.203; $3^{rd}$ Generation Partnership Project; Technical Specification Group Services and System Aspects; Policy and Charging Control Architecture (Release 10), V10.8.0 (Sep. 2012).

(Continued)

*Primary Examiner* — Dang Ton
*Assistant Examiner* — Ronald H Davis
(74) *Attorney, Agent, or Firm* — Baker Botts, LLP

(57) ABSTRACT

The present invention faces the issue of carrying out an IP Multimedia Subsystem Restoration procedure with help of Policing and Charging Control "PCC" architecture with new functions recently standardized and which conventional PCC nodes do not support. Thus, the present invention provides for making use of an enhanced Deep Packet Inspection device included in a Policing and Charging Enforcement Function "PCEF" server for inspecting signalling traffic and for detecting an identifier of a Proxy Call Session Control Function "P-CSCF" server during IMS registration by a user's equipment; so that the PCEF can monitor the P-CSCF availability without impacting other conventional PCC nodes.

13 Claims, 6 Drawing Sheets

(56) References Cited

OTHER PUBLICATIONS

International Search Report for PCT/EP2010/055298, mailed Sep. 15, 2010.
International Preliminary Report on Patentability for PCT/EP2010/055298, mailed Apr. 13, 2012.
J-J P Balbas et al., "Policy and charging control in the evolved packet system", *IEEE Communications Magazine*, vol. 44, No. 2, Feb. 1, 2009, pp. 68-74.
Universal Mobile Telecommunications System (UMTS); LTE, IMS Restoration Procedures (3GPP TS 23.380 version 9.1.0 Release 9) *Technical Specification, European Telecommunications Standard Institute (ETSI)*), vol. 3GPP CT 4, No. V9.1.0, Apr. 1, 2010.
3rd Generation Partnership Project; Technical Specification Group Core Network and Terminals; Policy and Charging Control over Rx reference point (Release 9), 2010.
3rd Generation Partnership Project; Technical Specification Group Core Network and Terminals; Policy and Charging Control over Gx reference point (Release 9), 2010.

* cited by examiner

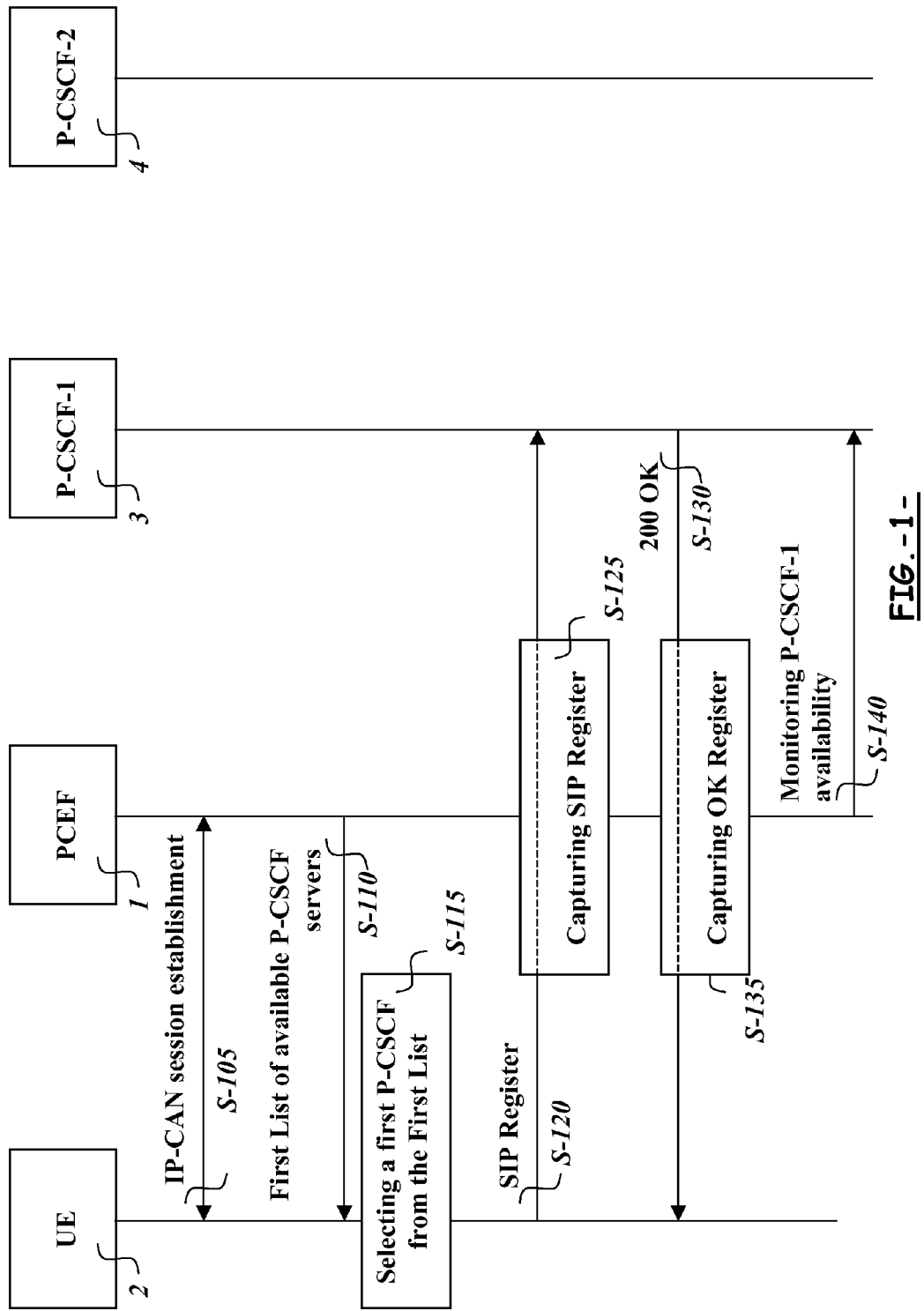
FIG. -1-

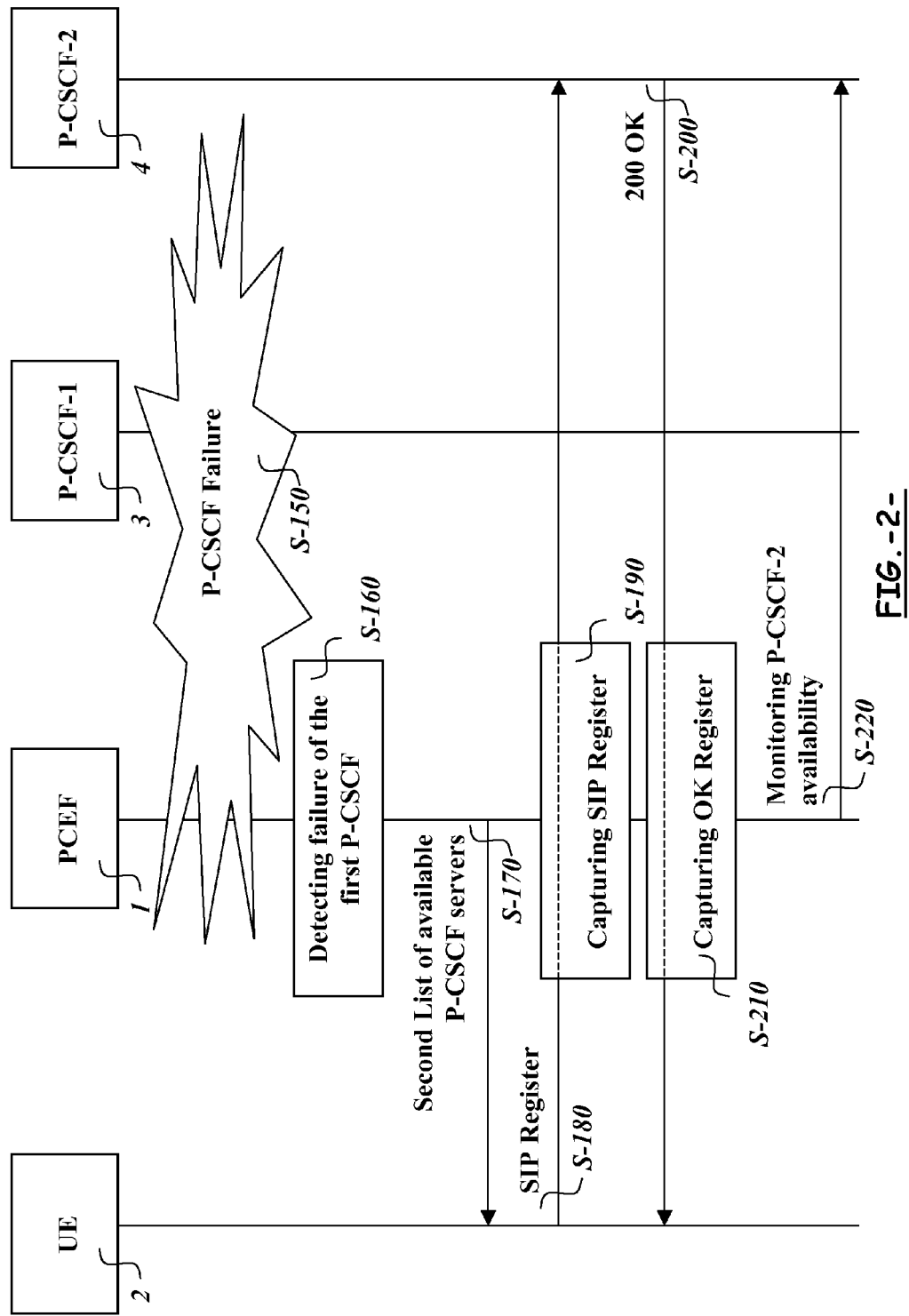
FIG. -2-

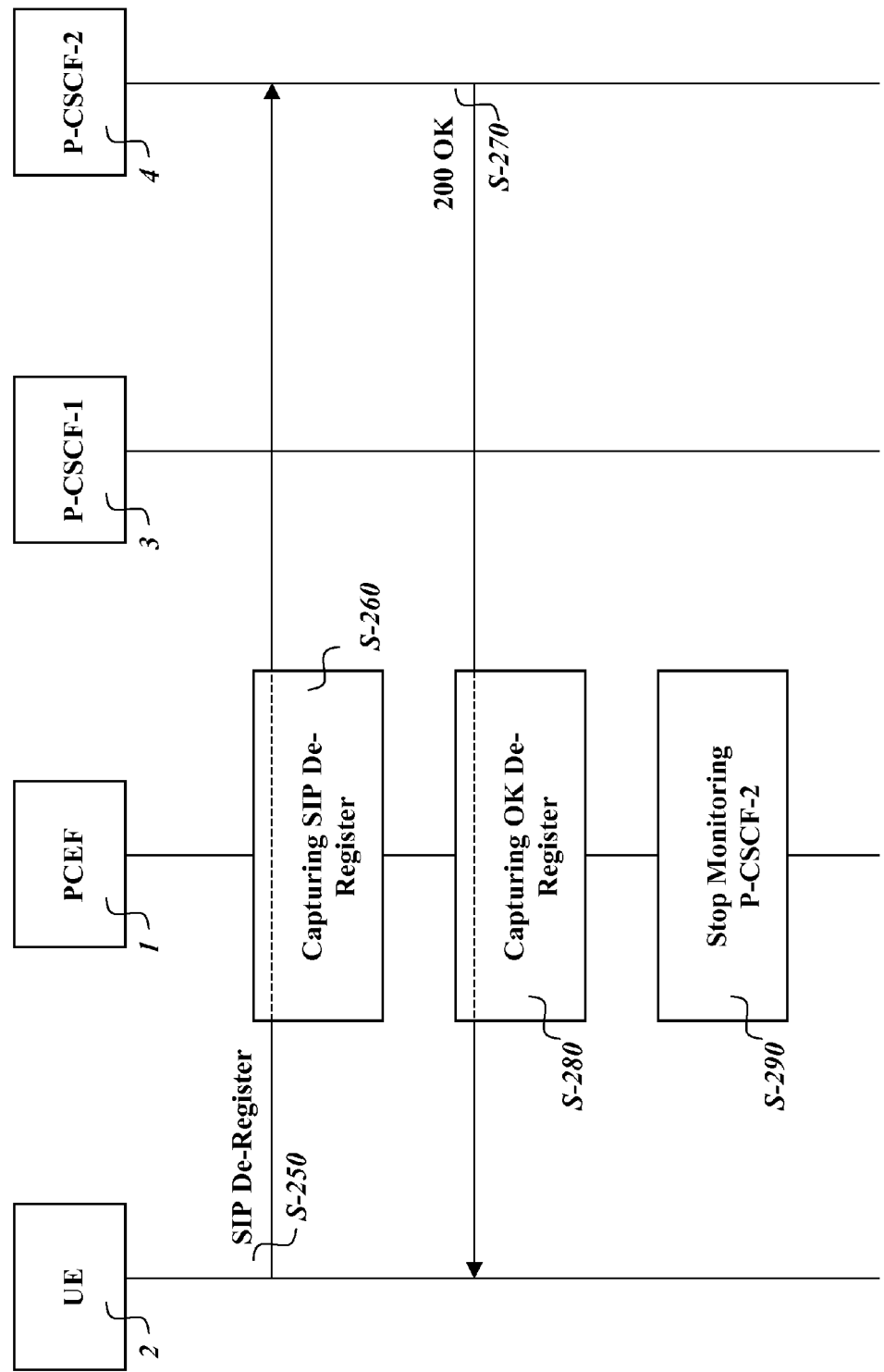
FIG. -3-

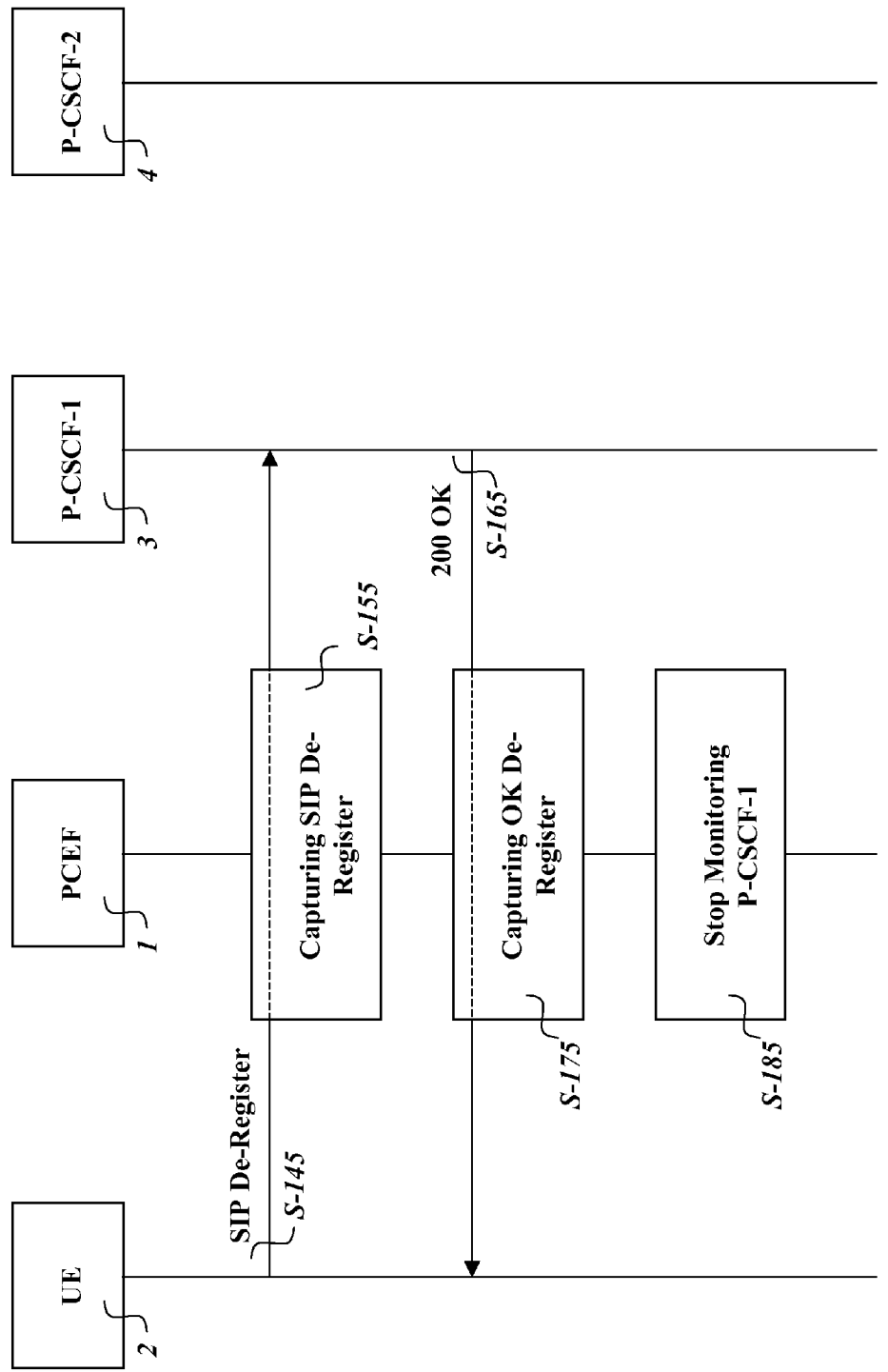
FIG. -4-

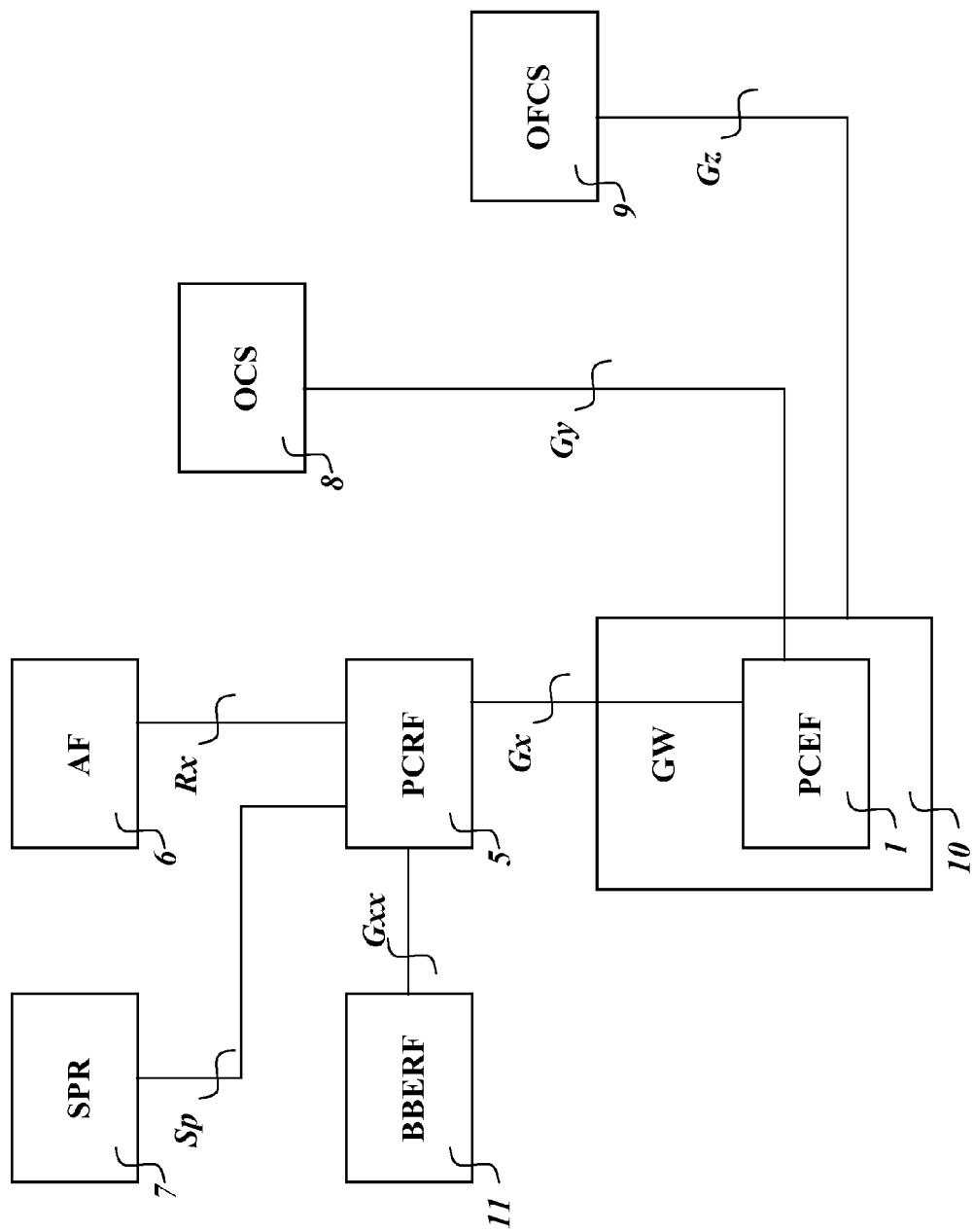
FIG. -5-

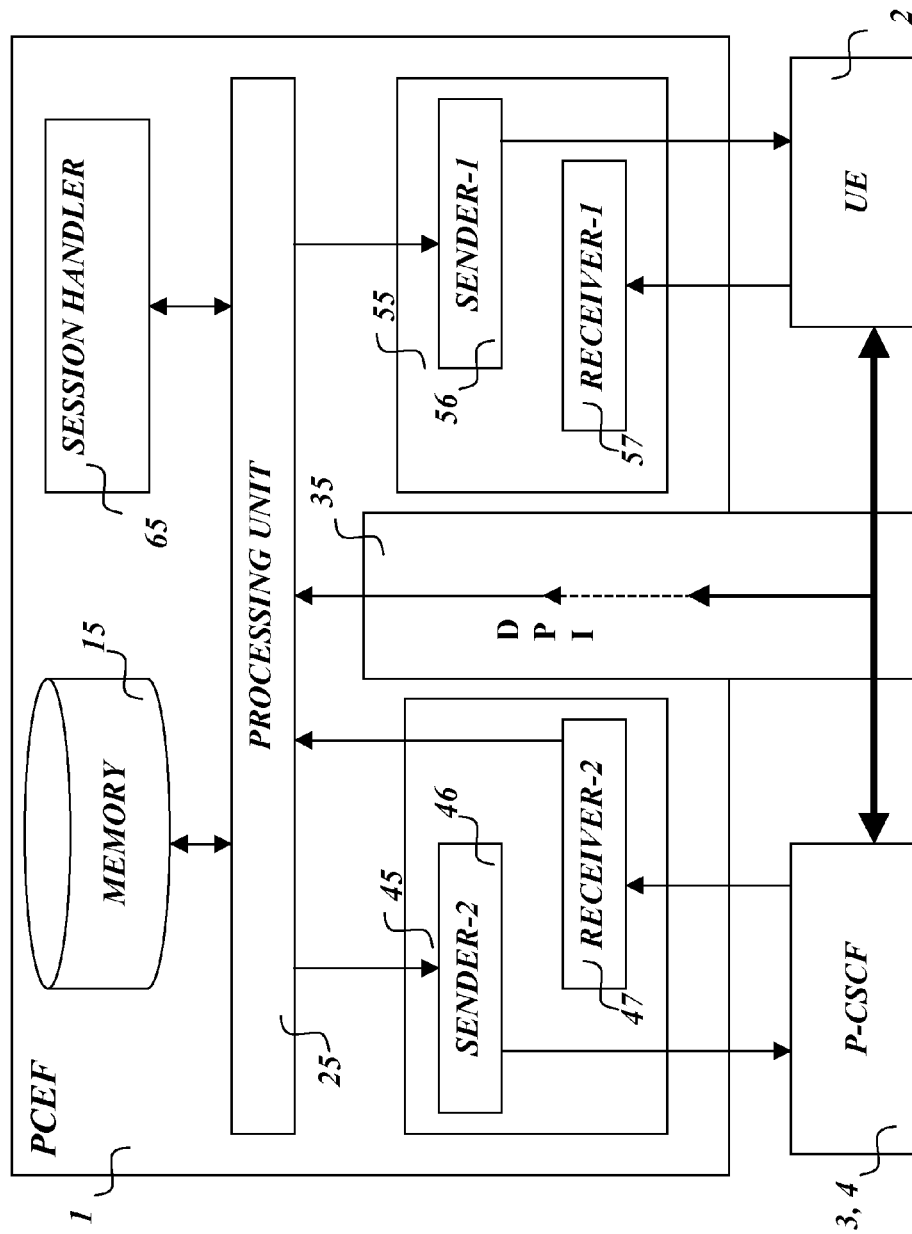
FIG. -6-

METHOD AND APPARATUS FOR AN IMS RESTORATION PROCEDURE

This application is the U.S. national phase of International Application No. PCT/EP2010/055298 filed 21 Apr. 2010 which designated the U.S., the entire contents of which is hereby incorporated by reference.

TECHNICAL FIELD

The present invention generally relates to IP Multimedia Subsystem with Policy and Charging Control and, more specifically, to an enhanced IP Multimedia Subsystem Restoration procedure with help of entities of a Policy and Charging Control architecture.

BACKGROUND

Even though network nodes in the IP Multimedia Subsystem (hereinafter IMS) core network should have a very high availability, some maintenance downtime and occasional failures are unavoidable. Therefore, a set of standardized procedures have been specified for IMS restoration. In this respect, 3GPP TS 23.380 Section 5 "Recovery after P-CSCF failure" covers the case of service interruption of a Proxy Call Session Control Function (hereinafter P-CSCF), by involving entities of a Policy and Charging Control (hereinafter PCC) architecture to convey the P-CSCF address through the so-called Rx and Gx interfaces.

The invention thus involves entities of a PCC architecture in accordance with 3GPP TS 23.203 for Evolved 3GPP Packet Switched domain, including both 3GPP accesses (GERAN/UTRAN/E-UTRAN) and Non-3GPP accesses. For the purposes of the present invention, the PCC architecture comprises an Application Function (hereinafter AF), a Policing and Charging Rules Function (hereinafter PCRF), and a Policing and Charging Enforcement Function (hereinafter PCEF). Particularly applicable where a PCC architecture cooperates with an IMS core network, the P-CSCF of the IMS core network behaves as, or includes, the AF of the PCC architecture.

At present, the existing IMS Restoration procedure as defined in 3GPP TS 23.380 is prepared by an AF node, namely the P-CSCF, receiving from a user's equipment (hereinafter UE) an IMS registration and passing the P-CSCF address to the PCRF and from the latter to the PCEF, in order to apply a so-called P-CSCF monitoring procedure by the PCEF and to trigger a PDP Context update/Bearer update where the P-CSCF is found to be unavailable by the PCEF.

That is, the PCEF cannot apply the P-CSCF monitoring procedure according to recent standards unless the PCEF receives the corresponding P-CSCF address from the PCRF.

Moreover, the current solution as stated by the 3 GPP technical specification has a number of limitations that can be summarized as being only applicable if all the entities involved, namely P-CSCF, PCRF and PCEF, are adapted to carry out such IMS Restoration, what is not the case for PCC deployments older than those for Release 9.

More specifically, the presently standard solution requires that the P-CSCF supports this functionality, is enabled to negotiate the feature with the PCRF and, if supported, provides additional data in the Rx interface. Moreover, the presently standard solution requires that the PCRF supports this functionality, is enabled to negotiate the feature with both P-CSCF and PCEF and, if supported by both, handles additional data in both Gx and Rx interfaces.

Obviously, all this requires extra signalling to provide this functionality through the Gx interface for those solutions where PCC rules for SIP signalling are statically configured in the PCEF; and, consequently, the IMS Restoration procedure as required by 3GPP technical specifications cannot be provided by PCC deployments not upgraded to Release 9.

SUMMARY

The present invention is aimed to at least minimize the above drawback and provides for making use of an enhanced Deep Packet Inspection (hereinafter DPI) technology applied in the bearer layer in order to achieve the main challenge of the IMS Restoration procedure, regarding P-CSCF failures, without needing the P-CSCF and PCRF be aware of it.

A conventional DPI technology supports packet inspection and service classification, which consists on IP packets classified according to a configured tree of rules so that they are assigned to a particular service session. DPI is now under standardization, a so-called Traffic Detection Function (hereinafter TDF), which can be either stand-alone or collocated with a PCEF, as disclosed in 3GPP TR 23.813.

More precisely, the present invention provides for a method whereby a PCEF node with enhanced DPI capabilities is arranged for inspecting user and signalling traffic and, based on that inspection, is arranged for detecting a P-CSCF identifier, such as a P-CSCF address, during the initial IMS registration by the UE; the PCEF may thus monitor the P-CSCF availability.

Eventually, the PCEF node with enhanced DPI capabilities may be arranged for triggering a PDP Context update/Bearer update in case the P-CSCF is unavailable, which would result in the UE registering in another available P-CSCF node; or may be arranged to stop such monitoring upon detection of an IMS de-registration procedure.

In accordance with a first aspect of the present invention, there is provided a new method for restoration of an IMS network upon unavailability of a P-CSCF server, which one or more user equipment "UE" accesses the IMS network through.

This method comprises the steps of: a PCEF server with DPI capabilities establishing an IP-CAN session with a UE; submitting from the PCEF server with DPI capabilities to the UE a first list of available P-CSCF servers; the PCEF server with DPI capabilities capturing a first registration message submitted from the UE towards a first P-CSCF server selected from the first list of available P-CSCF servers, extracting from the first registration message an identifier of the first P-CSCF server, and storing the identifier of the first P-CSCF server; upon successful registration of the UE through the first P-CSCF server, the PCEF server with DPI capabilities capturing a successful registration response message submitted from the first P-CSCF server towards the UE, and associating the identifier of the first P-CSCF server with the UE; and the PCEF server with DPI capabilities monitoring the availability of the first P-CSCF server.

This method is especially advantageous where this first P-CSCF suffers a failure which makes it unavailable for the UE to access the IMS network. To this end, the method may further comprise the steps of: upon detecting unavailability of the first P-CSCF server by the PCEF server with DPI capabilities, submitting from the PCEF server with DPI capabilities a second list of available P-CSCF servers, which excludes the unavailable first P-CSCF server, towards every UE associated with the identifier of the first P-CSCF server; the PCEF server with DPI capabilities capturing a further registration message submitted from the UE towards a second P-CSCF server from the second list of available P-CSCF servers, extracting from the further registration message an identifier of the second P-CSCF server, and storing said identifier of the second P-CSCF server; upon successful registration of the UE through the second P-CSCF server, the PCEF server with DPI capabilities capturing a further successful registration response message submitted from the second P-CSCF server towards the UE, and associating the identifier of the second P-CSCF server with the UE; and the PCEF server with DPI capabilities monitoring the availability of the second P-CSCF server.

In order to maintain the associations between UE's and P-CSCF servers updated the method also deals with de-registrations of UE's from the IMS network. In this respect, a UE may de-register from the IMS network through the second P-CSCF server where the user had register upon failure of the first P-CSCF, as well as through the first P-CSCF server before such first P-CSCF has suffered the failure.

Thus, where the UE is registered in the IMS network through the second P-CSCF server, this method may also include the steps of: the PCEF server with DPI capabilities capturing a de-registration message submitted from the UE towards the second P-CSCF server and extracting from the de-registration message the identifier of the second P-CSCF server; and, upon successful de-registration of the UE through the second P-CSCF server, the PCEF server with DPI capabilities capturing a successful de-registration response message submitted from the second P-CSCF server towards the UE, and resetting the association of the UE with the identifier of the second P-CSCF server. Moreover, since different UE's may be carrying out different actions through the this second P-CSCF server, this method may further comprise the steps of: determining whether any other UE is still associated with the identifier of the second P-CSCF server; and, where no more UE is associated with the identifier of the second P-CSCF server, the PCEF server with DPI capabilities stops monitoring the availability of the second P-CSCF server.

On the other hand, where the UE is registered in the IMS network through the second P-CSCF server, this method may also include the steps of: the PCEF server with DPI capabilities capturing a de-registration message submitted from the UE towards the first P-CSCF server and extracting from the de-registration message the identifier of the first P-CSCF server; and upon successful de-registration of the UE through the first P-CSCF server, the PCEF server with DPI capabilities capturing a successful de-registration response message submitted from the first P-CSCF server towards the UE, and resetting the association of the UE with the first P-CSCF server identifier. Moreover, since different UE's may be carrying out different actions through the this second P-CSCF server, this method may further comprise the steps of: determining whether any other UE is still associated with the identifier of the first P-CSCF server; and, where no more UE is associated with the identifier of the first P-CSCF server, the PCEF server with DPI capabilities stops monitoring the availability of the first P-CSCF server.

In accordance with a second aspect of the present invention, there is provided a new PCEF server for enforcing policing and charging rules applicable to packet flows originating or terminating in a UE.

This PCEF server comprises a processing unit and a session handler arranged for establishing an IP-CAN session with a UE through a first input/output unit, wherein the processing unit and the first input/output unit are arranged for submitting a first list of available P-CSCF servers towards the UE.

This PCEF server also comprises a DPI device with packet inspection and service classification capabilities for inspecting and classifying packet flows, wherein this DPI device is arranged for capturing a registration message submitted from the UE towards a first P-CSCF server and for extracting from the registration message an identifier of the first P-CSCF server, and wherein this DPI device is also arranged for capturing a successful registration response message submitted from the first P-CSCF server towards the UE.

The processing unit of this PCEF server is arranged for storing the identifier of the first P-CSCF server in storage, for associating in said storage the identifier of the first P-CSCF server with the UE, and for monitoring the availability of the first P-CSCF server through a second input/output unit.

In an embodiment aligned with the above method, where the first P-CSCF server becomes unavailable, the PCEF server may be provided so that, upon detecting by the processing unit the unavailability of the first P-CSCF server, the processing unit and the first input/output unit may be arranged for submitting a second list of available P-CSCF servers, which excludes the unavailable first P-CSCF server, towards every UE associated with the identifier of the first P-CSCF server.

Apart from that, the DPI device of the PCEF may be arranged for capturing a further registration message submitted from the UE towards a second P-CSCF server selected from the second list of available P-CSCF servers, for extracting from said further registration message an identifier of the second P-CSCF server, and for capturing a further successful registration response message submitted from the second P-CSCF server towards the UE; whereas the processing unit of the PCEF may be arranged for storing the identifier of the second P-CSCF server in the storage, for associating therein the identifier of the second P-CSCF server with the UE, and for monitoring the availability of the second P-CSCF server through the second input/output unit.

Following this embodiment where the UE registers in the IMS network through a second P-CSCF server upon failure of the first P-CSCF server, the UE may later on de-register from the IMS network. In order to keep updated the associations of UE's and P-CSCF servers the DPI device of the PCEF may be arranged for capturing a de-registration message submitted from the UE towards the second P-CSCF server, for extracting from the de-registration message the identifier of the second P-CSCF server, and for capturing a successful de-registration response message submitted from the second P-CSCF server towards the UE; whereas the processing unit of the PCEF may be arranged for resetting from the storage the association of the UE with the identifier of the second P-CSCF server. In addition, the processing unit of the PCEF may also be arranged for determining whether any other UE is still associated with the identifier of the second P-CSCF server and, where no more UE is associated with the identifier of the second P-CSCF server, this processing unit is arranged to stop monitoring the availability of the second P-CSCF server.

On the other hand, in an embodiment aligned with the above method, where the UE de-registers from the IMS network through the first P-CSCF server and without the latter having suffered any failure, the DPI device of the PCEF server may be arranged for capturing the de-registration message submitted from the UE towards the first P-CSCF server, for extracting from the de-registration message the identifier of the first P-CSCF server, and for capturing a successful de-registration response message submitted from the first P-CSCF server towards the UE; whereas the processing unit of the PCEF may be arranged for resetting from the storage the association of the UE with the identifier of the first P-CSCF server. In addition, the processing unit of the PCEF may also be arranged for determining whether any other UE is still associated with the identifier of the first P-CSCF server; and, where no more UE is associated with the identifier of the first P-CSCF server, this processing unit may be arranged to stop monitoring the availability of the first P-CSCF server.

In accordance with a third aspect of the invention, the invention may be practised by a computer program, this computer program being loadable into an internal memory of a computer with input and output units as well as with a processing unit, and comprising executable code adapted to carry out the above method steps. In particular, this executable code may be recorded in a carrier readable in the computer.

BRIEF DESCRIPTION OF THE DRAWINGS

The features, objects and advantages of the invention will become apparent by reading this description in conjunction with the accompanying drawings, in which:

FIG. 1 illustrates a basic sequence of actions to be followed for monitoring a first P-CSCF where a subscriber has registered in the IMS network through.

FIG. 2 illustrates a basic sequence of actions to be followed, upon detecting a failure of the P-CSCF where the subscriber is presently registered, for monitoring a further P-CSCF where the subscriber has further registered in the IMS network through.

FIG. 3 shows an exemplary sequence of actions to be followed to stop monitoring the further P-CSCF, where the subscriber de-registers from the IMS network.

FIG. 4 shows an exemplary sequence of actions to be followed to stop monitoring the first P-CSCF, where the subscriber de-registers from the IMS network, before this first P-CSCF has suffered a failure.

FIG. 5 illustrates a simplified view of Policing and Charging Control architecture.

FIG. 6 illustrates an exemplary implementation of a PCEF node with enhanced DPI capabilities, as provided for in accordance with the invention.

DETAILED DESCRIPTION

The following describes currently preferred embodiments of a PCEF server 1, which is generally used for enforcing policing and charging rules applicable to packet flows originating or terminating in a UE, this PCEF server 1 being arranged for carrying out a method for restoration of an IMS network upon unavailability of a P-CSCF server, which one or more user equipment UE accesses the IMS network through.

In this respect, FIG. 5 illustrates a general PCC architecture comprising an AF 6 which in particular might be an P-CSCF of an IMS network, a PCRF 5, a PCEF 1 which is generally provided as included in a gateway (hereinafter GW) 10 and more particularly in a Gateway GPRS Support Node (hereinafter GGSN), a Subscription Profile Repository (hereinafter SPR) 7, a Bearer-Binding and Event-Reporting Function (hereinafter BBERF) 11 which is generally provided in an access gateway such as a Serving Gateway (hereinafter S-GW), and an Online Charging System (hereinafter OCS) 8 and an Offline Charging System (hereinafter OFCS) 9 for respectively charging packet flows traversing the PCEF on online or offline modes.

The AF is an element offering applications the control of IP bearer resources according to what has been negotiated in the signalling layer; the AF communicates with the PCRF to transfer dynamic session information, namely description of the media to be delivered in the transport layer. The PCRF is the function providing policy and charging control for the Media Components negotiated from the UE through the AF; the PCRF creates PCC rules based on the information received from the AF to be installed in the PCEF. The PCEF encompasses service data flow detection based on filters included in the PCC rules, bearer binding as well as online and offline charging interactions and policy enforcement. The SPR provides subscription information regarding QoS parameters subscribed by the user such as bandwidth and others. The BBERF encompasses service data flow detection based on filters included in QoS rules and bearer binding when the interface between the BBERF and the PCEF is based on Mobile IP.

FIG. 1 illustrates a first embodiment of the invention whereby a first P-CSCF 3 is accessed by a UE 2 to register in the IMS network. As shown in FIG. 1, the PCEF with DPI capabilities carries out an IP connectivity access network "IP-CAN" session establishment with the UE 2 during a step S-105.

During this IP-CAN session establishment or soon afterwards, the PCEF with DPI capabilities submits during a step S-110 a first list of available P-CSCF servers to the UE 2 for the latter to select a first P-CSCF server during a step S-115, from the first list of available P-CSCF servers, to access the IMS network.

To this end, the PCEF 1 shown in FIG. 6 includes a processing unit 25 and a session handler 65 arranged for establishing the IP-CAN session with a UE 2 through a first input/output unit 55. In particular, this first input/output unit may be provided as an integral unit 55 or with separate input unit 57 and output unit 56. Moreover, the processing unit 25 and the first input/output unit 55 may be arranged for submitting the first list of available P-CSCF servers towards the UE.

Once the UE 2 has selected the first P-CSCF server, the UE submits during a step S-120 shown in FIG. 1 a register message towards said first P-CSCF 3. This register message is captured by the PCEF server with DPI capabilities during a step S-125.

In particular, the PCEF is equipped with a Deep Packet Inspection "DPI" device 35, as illustrated in FIG. 6, with packet inspection and service classification capabilities for inspecting and classifying packet flows and arranged for capturing the registration message submitted from the UE 2 towards a first P-CSCF server 3.

Back to FIG. 1 and during this step S-125, the PCEF server with DPI capabilities is also arranged for extracting from the first registration message an identifier of this first P-CSCF server 3, such as a first P-CSCF address, and for storing the identifier of the first P-CSCF server. Also in particular, the DPI device 35 of the PCEF shown in FIG. 6 may be arranged for extracting from the registration message the identifier of the first P-CSCF server 3, whereas the processing unit 25 may be arranged for storing the identifier of the first P-CSCF server in storage 15 of the PCEF.

Then, upon successful registration of the UE 2 through the first P-CSCF server 3, the sequence of actions illustrated in FIG. 1 continues with a successful registration response message submitted during a step S-130 from the first P-CSCF server 3 towards the UE 2. This successful registration response message is captured by the PCEF server with DPI capabilities during a step S-135. During this step S-135, the identifier of the first P-CSCF server is associated with the UE 2 at the PCEF.

To this end, the DPI device 35 of the PCEF shown in FIG. 6 may be arranged for capturing the successful registration response message submitted from the first P-CSCF server towards the UE, whereas the processing unit 25 may be arranged for associating the identifier of the first P-CSCF server 3 with the UE 2 in the storage 15.

Once the identifier of the first P-CSCF server 3 has been associated with the UE 2 in the PCEF, the PCEF may determine whether the UE 2 is the only one associated with the first P-CSCF server, in which case the PCEF may start monitoring the availability of the first P-CSCF server 3 during a step S-140 illustrated in FIG. 1, or the PCEF may determine that other UE's were already associated with this first P-CSCF server 3, in which case the PCEF was already monitoring the availability of the first P-CSCF server 3 and there is no need to start it.

To this end, the processing unit 25 of the PCEF shown in FIG. 6 may be arranged for monitoring the availability of the first P-CSCF server 3 through a second input/output unit 45. In particular, as for the first input/output unit, this second input/output unit may be provided as an integral unit 45 or with separate input unit 47 and output unit 46.

At this stage, different actions might occur and being relevant for the purpose of the present invention. For instance, the first P-CSCF 3 server might suffer a failure making it unavailable for accessing the IMS network, as illustrated in FIG. 2, or the UE 2 might de-register from the IMS network, as illustrated in FIG. 4.

FIG. 2 illustrates an embodiment where the first P-CSCF server 3 suffers a failure during a step S-150 making it unavailable for accessing the IMS network. Then, upon detecting unavailability of the first P-CSCF server 3 by the PCEF server 1 with DPI capabilities during a step S-160, the PCEF submits during a step S-170 a second list of available P-CSCF servers, which excludes the unavailable first P-CSCF server 3, towards every UE associated with the identifier of the first P-CSCF server; in particular, the second list of available P-CSCF servers is submitted to the UE 2 for the latter to select a second P-CSCF server 4 from the second list of available P-CSCF servers, during a step not illustrated in any drawing though similar to the one in FIG. 1, to access the IMS network. In this respect and not illustrated in any drawing, the method may further comprise a step of determining those UE's associated with a particular P-CSCF server.

Still with reference to FIG. 2 and once the UE 2 has selected the second P-CSCF server 4, the UE submits during a step S-180 a further registration message towards said second P-CSCF 4. This further registration message is captured by the PCEF server with DPI capabilities during a step S-190. During this step S-190, the PCEF server with DPI capabilities is also arranged for extracting from the further registration message an identifier of this second P-CSCF server 4, such as a second P-CSCF address, and for storing the identifier of this second P-CSCF server 4.

Then, upon successful registration of the UE 2 through the second P-CSCF server 4, a successful registration response message is submitted during a step S-200 from the second P-CSCF server 4 towards the UE 2. This successful registration response message is captured by the PCEF server with DPI capabilities during a step S-210. During this step S-210, the identifier of the second P-CSCF server is associated with the UE 2 at the PCEF, thus replacing the previous association of the UE 2 with the first P-CSCF 3.

As for the previous embodiment with the first P-CSCF server, once the identifier of the second P-CSCF server 4 has been associated with the UE 2 in the PCEF, the PCEF may determine whether the UE 2 is the only one associated with the second P-CSCF server, in which case the PCEF may start monitoring the availability of this second P-CSCF server 4 during a step S-220, or the PCEF may determine that other UE's were already associated with this second P-CSCF server 4, in which case the PCEF was already monitoring the availability of the second P-CSCF server 4 and there is no need to start it.

To this end, the processing unit 25 and the first input/output unit 55 of the PCEF shown in FIG. 6 may be arranged for submitting, upon detection by the processing unit of unavailability of the first P-CSCF server, a second list of available P-CSCF servers, which excludes the unavailable first P-CSCF server, towards every UE associated with the identifier of the first P-CSCF server.

Moreover, the DPI device 35 of the PCEF shown in FIG. 6 may be arranged for capturing the further registration message submitted from the UE towards the second P-CSCF server 4 and for extracting from said further registration message the identifier of the second P-CSCF server; and this DPI device 35 may also be arranged for capturing the further successful registration response message submitted from the second P-CSCF server 4 towards the UE 2.

Apart from that, the processing unit 25 of the PCEF shown in FIG. 6 may be arranged for storing the identifier of the second P-CSCF server 4 in the storage 15, for associating therein the identifier of the second P-CSCF server with the UE 2; and for monitoring the availability of the second P-CSCF server through the second input/output unit 45.

Prior to, or instead of, detecting the failure in the first P-CSCF server 3 as illustrated in FIG. 2, the UE 2 might have de-registered from the IMS network through the first P-CSCF server as shown by the sequence of actions illustrated in FIG. 4.

As shown in FIG. 4, and whilst the PCEF with DPI capabilities is monitoring the first P-CSCF server 3, the UE 2 may submit during a step S-145 a de-registration message towards the first P-CSCF server 3 in order to de-register from the IMS network.

This de-registration message is captured by the PCEF server with DPI capabilities during a step S-155. During this step S-155, the PCEF server with DPI capabilities is also arranged for extracting from the de-registration message an identifier of this first P-CSCF server 3.

Then, upon successful de-registration of the UE 2 through the first P-CSCF server 3, a successful de-registration response message is submitted during a step S-165 from the first P-CSCF server 3 towards the UE 2. This successful de-registration response message is captured by the PCEF server with DPI capabilities during a step S-175. During this step S-175, the PCEF server with DPI capabilities resets the association of the UE 2 with the identifier of the first P-CSCF server 3.

Once the association between the identifier of the first P-CSCF server 3 and the UE 2 has been reset in the PCEF, the method may include a step not illustrated in any drawing of determining whether any other UE is still associated with the identifier of the first P-CSCF server 3; and where no more UE is associated with the identifier of the first P-CSCF server 3, the PCEF server with DPI capabilities may stop monitoring the availability of the first P-CSCF server during a step S-185. Otherwise, where other UE's are still associated with the first P-CSCF server, the PCEF server with DPI capabilities may continue monitoring the availability of the first P-CSCF server.

To this end, the DPI device 35 of the PCEF shown in FIG. 6 may be arranged for capturing the de-registration message submitted from the UE 2 towards the first P-CSCF server 3 and for extracting from the de-registration message the identifier of the first P-CSCF server. Also, the DPI device 35 of the PCEF shown in FIG. 6 may be arranged for capturing the successful de-registration response message submitted from the first P-CSCF server 3 towards the UE 2.

Moreover, the processing unit 25 of the PCEF shown in FIG. 6 may be arranged for resetting from the storage 15 the association of the UE 2 with the identifier of the first P-CSCF server 3, for determining whether any other UE is still associated with the identifier of the first P-CSCF server 3; and, where no more UE is associated with the identifier of the first P-CSCF server, this processing unit 25 may be arranged to stop monitoring the availability of the first P-CSCF server 3.

In a similar manner as the UE might de-register from the IMS network through the first P-CSCF server 3, the UE 2 may also de-register from the IMS network through the second P-CSCF server 4 that the UE had accessed upon failure of the first P-CSCF server 3.

Thus, as illustrated in FIG. 3 and whilst the PCEF with DPI capabilities is monitoring the second P-CSCF server 4, the UE 2 may submit during a step S-250 a de-registration message towards the second P-CSCF server 4 in order to de-register from the IMS network.

This de-registration message is captured by the PCEF server with DPI capabilities during a step S-260. During this step S-260, the PCEF server with DPI capabilities is also arranged for extracting from the de-registration message an identifier of this second P-CSCF server 4.

Then, upon successful de-registration of the UE 2 through the second P-CSCF server 4, a successful de-registration response message is submitted during a step S-270 from the second P-CSCF server 4 towards the UE 2. This successful de-registration response message is captured by the PCEF server with DPI capabilities during a step S-280. During this step S-280, the PCEF server with DPI capabilities resets the association of the UE 2 with the identifier of the second P-CSCF server 4.

Once the association between the identifier of the second P-CSCF server 4 and the UE 2 has been reset in the PCEF, the method may include a step not illustrated in any drawing of determining whether any other UE is still associated with the identifier of the second P-CSCF server 4; and, where no more UE is associated with the identifier of the second P-CSCF server 4, the PCEF server with DPI capabilities may stop monitoring the availability of the second P-CSCF server 4 during a step S-290. Otherwise, where other UE's are still associated with the second P-CSCF server, the PCEF server with DPI capabilities may continue monitoring the availability of the second P-CSCF server.

To this end, the DPI device 35 of the PCEF shown in FIG. 6 may be arranged for capturing the de-registration message submitted from the UE 2 towards the second P-CSCF server 4 and for extracting from the de-registration message the identifier of the second P-CSCF server 4. Also, this DPI device 35 may be arranged for capturing the successful de-registration response message submitted from the second P-CSCF server 4 towards the UE 2.

Moreover, the processing unit 25 of the PCEF shown in FIG. 6 may be arranged for resetting from the storage 15 the association of the UE 2 with the identifier of the second P-CSCF server 4, for determining whether any other UE is still associated with the identifier of the second P-CSCF server 4; and, where no more UE is associated with the identifier of the second P-CSCF server 4, this processing unit 25 may be arranged to stop monitoring the availability of the second P-CSCF server 4.

The invention may also be practised by a computer program, loadable into an internal memory of a computer with input and output units as well as with a processing unit. This computer program comprises to this end executable code adapted to carry out the above method steps when running in the computer. In particular, the executable code may be recorded in a carrier readable means in a computer.

The invention is described above in connection with various embodiments that are intended to be illustrative and non-restrictive. It is expected that those of ordinary skill in this art may modify these embodiments. The scope of the invention is defined by the claims in conjunction with the description and drawings, and all modifications that fall within the scope of the claims are intended to be included therein.

The invention claimed is:

1. A method for restoration of an IP Multimedia Subsystem (IMS) network upon unavailability of a Proxy Call Session Control Function (P-CSCF) server, wherein one or more user equipment (UE) accesses the IMS network through the P-CSCF server, the method comprising:
   establishing, by a Policing and Charging Enforcement Function (PCEF) server, an IP Connectivity Access Network (IP-CAN) session with a UE;
   submitting, from the PCEF server to the UE, a first list of available P-CSCF servers;
   capturing, by the PCEF server, a first registration message submitted from the UE towards a first P-CSCF server selected from the first list of available P-CSCF servers, extracting from the first registration message an identifier of the first P-CSCF server, and storing the identifier of the first P-CSCF server;
   upon successful registration of the UE through the first P-CSCF server, capturing, by the PCEF server, a successful registration response message submitted from the first P-CSCF server towards the UE, and associating the identifier of the first P-CSCF server with the UE;
   monitoring, by the PCEF server, the availability of the first P-CSCF server; and
   upon detecting unavailability of the first P-CSCF server by the PCEF, submitting from the PCEF server a second list of available P-CSCF servers, which excludes the unavailable first P-CSCF server, towards every UE associated with the identifier of the first P-CSCF server.

2. The method of claim 1, further comprising:
   capturing, by the PCEF server, a further registration message submitted from the UE towards a second P-CSCF server from the second list of available P-CSCF servers, extracting from the further registration message an identifier of the second P-CSCF server, and storing said identifier of the second P-CSCF server;
   upon successful registration of the UE through the second P-CSCF server, capturing, by the PCEF server, a further successful registration response message submitted from the second P-CSCF server towards the UE, and associating the identifier of the second P-CSCF server with the UE; and
   monitoring, by the PCEF server, the availability of the second P-CSCF server.

3. The method of claim 2, further comprising:
   capturing, by the PCEF server, a de-registration message submitted from the UE towards the second P-CSCF server and extracting from the de-registration message the identifier of the second P-CSCF server; and
   upon successful de-registration of the UE through the second P-CSCF server, capturing, by the PCEF server, a successful de-registration response message submitted from the second P-CSCF server towards the UE, and resetting the association of the UE with the identifier of the second P-CSCF server.

4. The method of claim 3, further comprising:
determining whether any other UE is still associated with the identifier of the second P-CSCF server; and
where no more UE is associated with the identifier of the second P-CSCF server, stopping monitoring, by the PCEF server, the availability of the second P-CSCF server.

5. The method of claim 1, further comprising:
capturing, by the PCEF server, a de-registration message submitted from the UE towards the first P-CSCF server and extracting from the de-registration message the identifier of the first P-CSCF server; and
upon successful de-registration of the UE through the first P-CSCF server, capturing, by the PCEF server, a successful de-registration response message submitted from the first P-CSCF server towards the UE, and resetting the association of the UE with the first P-CSCF server identifier.

6. The method of claim 5, further comprising:
determining whether any other UE is still associated with the identifier of the first P-CSCF server; and
where no more UE is associated with the identifier of the first P-CSCF server, stopping monitoring, by the PCEF server, the availability of the first P-CSCF server.

7. A Policing and Charging Enforcement Function (PCEF) server for enforcing policing and charging rules applicable to packet flows originating or terminating in a UE, the PCEF server comprising:
a processing unit and a session handler configured to establish an IP Connectivity Access Network (IP-CAN) session with a UE through a first input/output unit;
the processing unit and the first input/output unit configured to submit a first list of available P-CSCF servers towards the UE;
an inspection device with packet inspection and service classification capabilities for inspecting and classifying packet flows and configured to capture a registration message submitted from the UE towards a first P-CSCF server, to extract from the registration message an identifier of the first P-CSCF server, and to capture a successful registration response message submitted from the first P-CSCF server towards the UE;
the processing unit configured to store the identifier of the first P-CSCF server in a storage, and to associate therein the identifier of the first P-CSCF server with the UE;
the processing unit configured to monitor the availability of the first P-CSCF server through a second input/output unit;
wherein upon detecting by the processing unit unavailability of the first P-CSCF server, the processing unit and the first input/output unit are configured to submit a second list of available P-CSCF servers, which excludes the unavailable first P-CSCF server, towards every UE associated with the identifier of the first P-CSCF server.

8. The PCEF server of claim 7, wherein:
the inspection device is configured to capture a further registration message submitted from the UE towards a second P-CSCF server and to extract from said further registration message an identifier of the second P-CSCF server;
the inspection device is configured to capture a further successful registration response message submitted from the second P-CSCF server towards the UE;
the processing unit is configured to store the identifier of the second P-CSCF server in the storage, and to associate therein the identifier of the second P-CSCF server with the UE; and
the processing unit is configured to monitor the availability of the second P-CSCF server through the second input/output unit.

9. The PCEF server of claim 8, wherein:
the inspection device is configured to capture a de-registration message submitted from the UE towards the second P-CSCF server and to extract from the de-registration message the identifier of the second P-CSCF server;
the inspection device is configured to capture a successful de-registration response message submitted from the second P-CSCF server towards the UE; and
the processing unit configured to reset from the storage the association of the UE with the identifier of the second P-CSCF server.

10. The PCEF server of claim 9, wherein the processing unit is configured to determine whether any other UE is still associated with the identifier of the second P-CSCF server; and, where no more UE is associated with the identifier of the second P-CSCF server, the processing unit is configured to stop monitoring the availability of the second P-CSCF server.

11. The PCEF server of claim 7, wherein:
the inspection device is configured to capture a de-registration message submitted from the UE towards the first P-CSCF server and to extract from the de-registration message the identifier of the first P-CSCF server;
the inspection device is configured to capture a successful de-registration response message submitted from the first P-CSCF server towards the UE; and
the processing unit is configured to reset from the storage the association of the UE with the identifier of the first P-CSCF server.

12. The PCEF server of claim 11, wherein the processing unit is configured to determine whether any other UE is still associated with the identifier of the first P-CSCF server; and, where no more UE is associated with the identifier of the first P-CSCF server, the processing unit is configured to stop monitoring the availability of the first P-CSCF server.

13. A program on a non-transitory computer readable medium comprising instructions which, when executed by a processor of a PCEF server, cause the processor to carry out the method steps of claim 1.

* * * * *

UNITED STATES PATENT AND TRADEMARK OFFICE
CERTIFICATE OF CORRECTION

PATENT NO. : 9,083,714 B2
APPLICATION NO. : 13/636408
DATED : July 14, 2015
INVENTOR(S) : Fernandez Alonso et al.

It is certified that error appears in the above-identified patent and that said Letters Patent is hereby corrected as shown below:

Title Page

In Item (75), under "Inventors", in Column 1, Line 2, delete "Munoz" and insert -- Muñoz --, therefor.

On Page 2, in Item (56), under "OTHER PUBLICATIONS", in Column 2, Line 4, delete "(ETSI))," and insert -- (ETSI), --, therefor.

Specification

In Column 1, Line 54, delete "3 GPP" and insert -- 3GPP --, therefor.

Signed and Sealed this
Twenty-second Day of March, 2016

Michelle K. Lee
*Director of the United States Patent and Trademark Office*